United States Patent
Ghanem et al.

(10) Patent No.: US 7,269,644 B1
(45) Date of Patent: Sep. 11, 2007

(54) PERFORMANCE PROFILING FOR IMPROVED DATA THROUGHPUT

(75) Inventors: Ayman Mohammad Ghanem, Bloomington, MN (US); Mark A. Bakke, Maple Grove, MN (US)

(73) Assignee: Cisco Technology Inc., San Jose, CA (US)

( * ) Notice: Subject to any disclaimer, the term of this patent is extended or adjusted under 35 U.S.C. 154(b) by 765 days.

(21) Appl. No.: 10/371,389

(22) Filed: Feb. 21, 2003

(51) Int. Cl.
  *G06F 15/173* (2006.01)
  *G06F 11/00* (2006.01)
  *G06F 3/00* (2006.01)
(52) U.S. Cl. .................. 709/223; 709/226; 714/47; 710/8
(58) Field of Classification Search ............... 709/223, 709/224, 226, 229, 232; 714/47; 710/1, 710/5, 7, 15, 36, 8
See application file for complete search history.

(56) References Cited

U.S. PATENT DOCUMENTS

| | | | |
|---|---|---|---|
| 6,845,403 B2 * | 1/2005 | Chadalapaka | 710/5 |
| 6,865,617 B2 * | 3/2005 | Zeidner et al. | 710/3 |
| 2003/0120676 A1 * | 6/2003 | Holavanahalli et al. | 707/102 |
| 2004/0125806 A1 * | 7/2004 | Barzilai et al. | 370/395.21 |

\* cited by examiner

*Primary Examiner*—Ario Etienne
*Assistant Examiner*—El Hadji Sall
(74) *Attorney, Agent, or Firm*—Schwegman, Lundberg, Woessner & Kluth P.A.

(57) ABSTRACT

A computer-implemented system and method for performance profiling on a target device. The computer-implemented method includes configuring the target device to operate in a first mode or a second mode, and receiving a write command from a host device. When the target device is configured to operate in the first mode, the method includes sending an authorization to send write data to the host device, and receiving write data from the host device. When the target device is configured to operate in the second mode, the method includes allocating a reserved write buffer on the target device, and receiving write data from the host device using the write buffer.

15 Claims, 11 Drawing Sheets

Fig. 10

PERFORMANCE PROFILING FOR IMPROVED DATA THROUGHPUT

FIELD OF THE INVENTION

The present invention relates to data processing, and more particularly to performance profiling to achieve improved data throughput.

BACKGROUND OF THE INVENTION

In data-processing systems, there is often high data throughput. Such systems typically contain devices that need to transfer, store, or manage large quantities of data. Storage devices, for example, have the capability to store mass quantities of data that is made available to other devices in the system.

In these data-processing systems, large amounts of memory space are needed for the various transfer, storage, and management operations. Because there is such a high volume of data, it may often be difficult to mange this memory space efficiently to achieve optimal system performance. Therefore, the intelligence of such systems will often need to implement various methods of data or flow control.

In a first method, these data-processing systems will perform some form of flow control. For example, in systems that use the Small Computer System Interface (SCSI) protocol and that implement flow control, host devices are not permitted to send unsolicited data. Instead, these host devices must receive authorization (or solicitation) to send data to a target device. Such authorizations that are sent from the target devices are coined "ready-to-transfer," or "R2T," commands. Once a host device has received an R2T from the target, it may then (and only then) send data to the target. The systems implementing this method, or other similar methods, of flow control achieve better memory management, because memory space is not allocated for host devices until it is available for use. These systems, however, are not able to achieve as high of a performance for data throughput.

In a second method, these data-processing systems will simply allow certain devices to send commands and data to other devices without much limitation. In this method, there is no real flow control to manage data throughput. While these systems may have good performance, they may encounter memory problems. In order to allow such unconditional and unsolicited data transfer, large amounts of memory space are needed. When this memory space is not managed effectively, there will be insufficient space to hold the high volume of unsolicited data transferred in the system. When memory runs short, error recovery mechanisms will need to be put into effect.

Therefore, for the reasons stated above, and for other reasons stated below which will become apparent to those skilled in the art upon reading and understanding the present specification, there is a need for the present invention.

SUMMARY OF THE INVENTION

Various embodiments of the present invention are provided herein. One embodiment provides a computer-implemented method for performance profiling on a target device. In this embodiment, the computer-implemented method includes configuring the target device to operate in a first mode or a second mode, and receiving a write command from a host device. When the target device is configured to operate in the first mode, the method includes sending an authorization to send write data to the host device, and receiving write data from the host device. When the target device is configured to operate in the second mode, the method includes allocating a reserved write buffer on the target device, and receiving write data from the host device using the write buffer. In one embodiment, configuring the target device to operate in a first mode or a second mode includes configuring the target device to operate in a high-performance mode or a low-performance mode.

This embodiment, as well as other embodiments, will be described in the detailed description below.

BRIEF DESCRIPTION OF THE DRAWINGS

FIG. 10 shows an example screen display for configuring performance profiling, according to one embodiment of the present invention.

DETAILED DESCRIPTION

In the following detailed description of the embodiments, reference is made to the accompanying drawings which form a part hereof, and in which are shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Figure 1A:
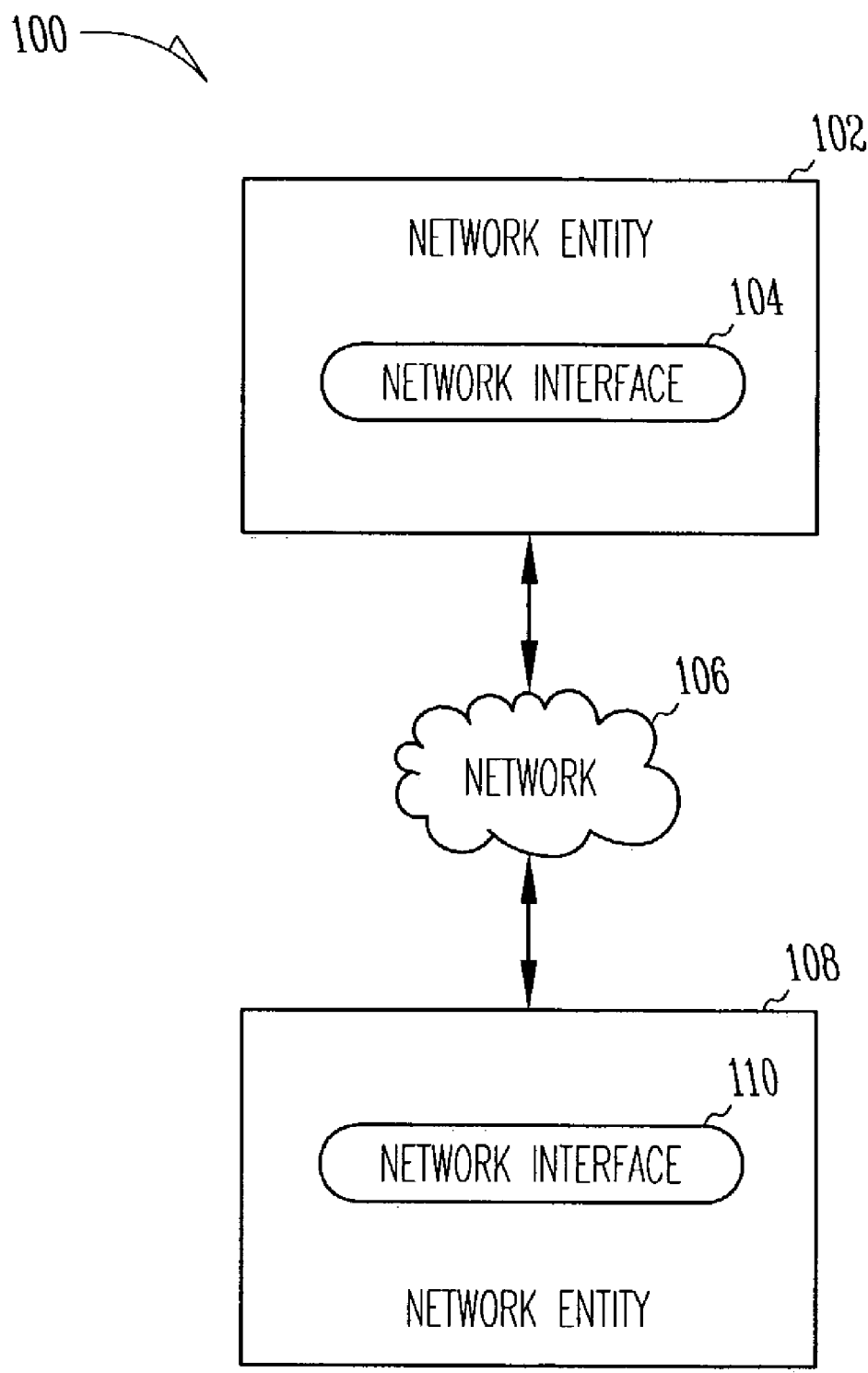
FIG. 1A shows a block diagram of a system having a number of network entities to implement various embodiments of the present invention.

FIG. 1A shows a block diagram of a system having a number of network entities to implement various embodiments of the present invention. In FIG. 1, system 100 includes network entity 102, network 106, and network entity 108. Network entity 102 is coupled to network 106 via its network interface 104. Network entity 108 is coupled to network 106 via its network interface 110. In one embodiment, network 106 includes a local area network. In one embodiment, network 106 includes a wide area network, such as the Internet. In one embodiment, network entity 102 includes a host computing environment, while network entity 108 includes a target storage environment. In various embodiments, network entities 102 and 106 use various protocols to communicate with network 106. In one embodiment, the Small Computer System Interface (SCSI) protocol is used. In this embodiment, network interfaces 104 and 110 include SCSI network interfaces to interface with network 106. In one embodiment, the Internet SCSI (iSCSI) protocol is used. In this embodiment, network interfaces 104 and 110 include iSCSI network interfaces to interface with network 106.

Figure 1B:
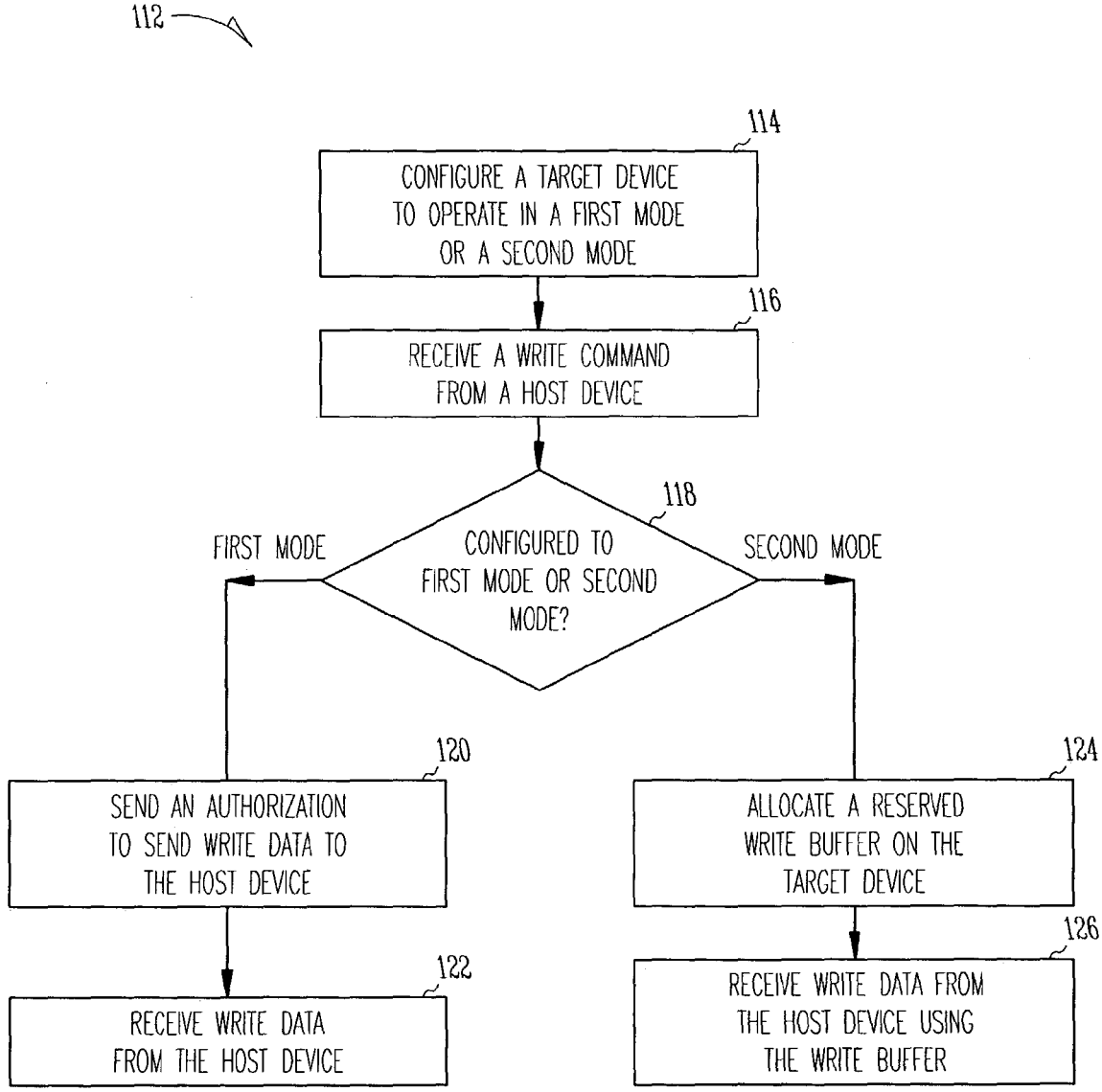
FIG. 1B shows a flow diagram of the operation of one embodiment of the system shown in FIG. 1A.

FIG. 1B shows a flow diagram of the operation of one embodiment of the system shown in FIG. 1A. In this embodiment, network entity 102 includes a host device, and network entity 108 includes a target device. Flow diagram 112 shows a computer-implemented method for performance profiling on the target device. At 114, the target device is configured to operate in a first or second mode. At 116, the target device receives a write command from the host device. At 118, the target device is checked to determine if it is configured in the first or second mode. If configured in the first mode, the target device sends an authorization to send write data to the host device at 120, and then the target device receives write data from the host device at 122. If configured in the second mode, the target device allocates a reserved write buffer at 124, and then receives write data from the host device using the write buffer at 126.

Figure 2A:
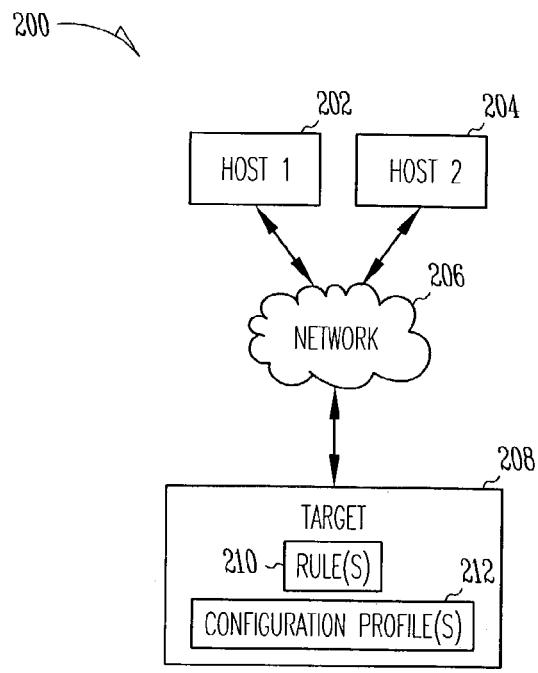
FIG. 2A shows a block diagram of a system having a number of hosts and a target device for implementing various embodiments of the present invention, the target device having one or more rules and one or more configuration profiles.

FIG. 2A shows a block diagram of a system having a number of hosts and a target device for implementing various embodiments of the present invention, the target device having one or more rules and one or more configuration profiles. System 200 includes host 202 ("host 1"), host 204 ("host 2"), network 206, and target device 208. Host 202, host 204, and target device 208 are each coupled to network 206. In one embodiment, network 206 includes a local area network. In one embodiment, network 206 includes a wide area network, such as the Internet. In one embodiment, target device 208 includes an additional interface to a storage area network. In one embodiment, target device 208 further includes a routing subsystem. Host 202, host 204, and target device 208 communicate via network 206 using the iSCSI protocol, in one embodiment. Target device 208 contains one or more rules 210, and one or more configuration profiles 212. Configuration profiles 212 contain information regarding the configuration of target device 208. Rules 210 contain operating rules governing the runtime functionality of target device 208.

Figure 2B:
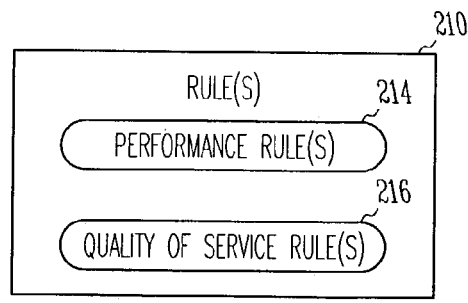
FIG. 2B shows a block diagram of one or more performance rules and one or more quality of service rules, according to one embodiment of the rules shown in FIG. 2A.

FIG. 2B shows a block diagram of one or more performance rules and one or more quality of service rules, according to one embodiment of the rules shown in FIG. 2A. FIG. 2B shows only one specific embodiment for rules 210; many other variations may exist in other embodiments. In FIG. 2B, rules 210 includes one or more performance rules 214, and one or more quality of service rules 216. Quality of service rules 216 contain rules that govern the quality of service for data transfer to and from target device 208. Performance rules 214 contain rules that govern the performance for data transfer between target device 208 and other hosts, such as host 202 and host 204.

Figure 2C:
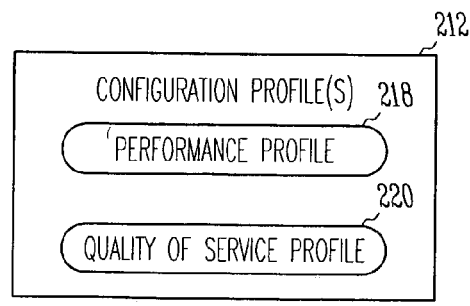
FIG. 2C shows a block diagram of a performance profile and a quality of service profile, according to one embodiment of the configuration profiles shown in FIG. 2A.

FIG. 2C shows a block diagram of a performance profile and a quality of service profile, according to one embodiment of the configuration profiles shown in FIG. 2A. FIG. 2C shows only one specific embodiment for configuration profiles 212; many other variations may exist in other embodiments. In FIG. 2C, configuration profiles 212 includes performance profile 218, and quality of service profile 220. Performance profile 218 contains configuration information for the performance characteristics of target device 208. Quality of service profile 220 contains configuration information for the quality of service characteristics of target device 208.

Figure 2D:
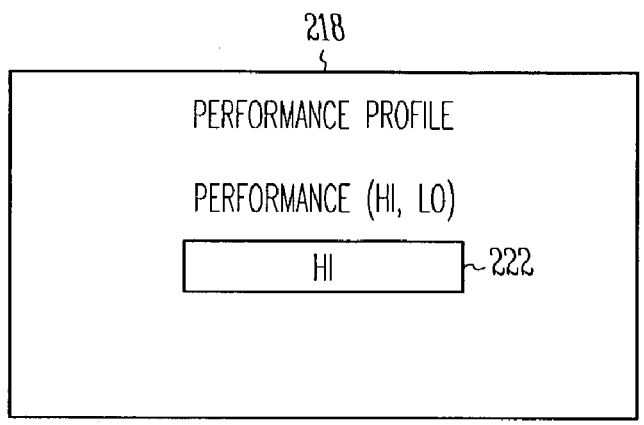
FIG. 2D shows a block diagram of a performance profile, according to one embodiment of the performance profile shown in FIG. 2C.

FIG. 2D shows a block diagram of a performance profile, according to one embodiment of the performance profile shown in FIG. 2C. FIG. 2D shows one particular embodiment of performance profile 218. In this embodiment, performance profile 218 includes a performance mode indicator 222. Performance mode indicator 222 can be configured according to one of two modes (in this embodiment): HI or LO. In FIG. 2D, performance mode indicator 222 is configured in the HI mode. Other embodiments may use different variations of entries for performance mode indicator 222. For example, in one embodiment, performance mode indicator 222 may be configured according to a HI, MED, or LO mode.

Target device 208 uses performance profile 218, as shown in FIG. 2D, as follows. Target device 208 includes a network interface that couples the device to network 206. Target device 208 also includes a number of memory buffers that are used to hold write data. Such write data may be obtained from various hosts, such as host 202 or host 204. Performance profile 218 is configured to either a first or second performance mode (such as HI or LO). Rules 210 (and, more particularly, performance rules 214, in one embodiment) are operable on performance profile 218. Performance rules 214 cause target device 208 to reserve a predetermined number of the memory buffers for unsolicited write data sent to target device 208 when performance profile 218 is configured to the first performance mode (such as the HI mode, in one embodiment). The number of memory buffers is, in one embodiment, predetermined from a configuration setting. Alternatively, when performance profile 218 is configured to the second performance mode (such as the LO mode, in one embodiment), performance rules 214 cause target device 208 to use the memory buffers only for solicited write data sent to target device 208. In the second performance mode, hosts must receive authorization, or solicitation from, target device 208 before sending write data to target device 208.

Figure 2E:
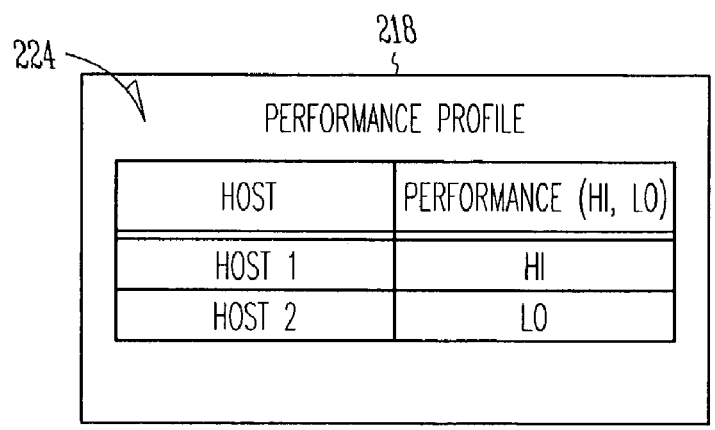
FIG. 2E shows a block diagram of a performance profile, according to one embodiment of the performance profile shown in FIG. 2C.

FIG. 2E shows a block diagram of a performance profile, according to one embodiment of the performance profile shown in FIG. 2C. FIG. 2E shows another embodiment for performance profile 218. In this embodiment, performance profile 218 includes a plurality of host entries 224. As shown, "host 1" and "host 2" are included, and each has a corresponding performance mode indicator. "Host 1" has a HI performance mode setting, and "host 2" has a LO performance setting. In this fashion, performance profile 218 is capable of including customized performance settings on a per host basis.

Target device 208 uses performance profile 218, as shown in FIG. 2E, as follows. Target device 208 includes a network interface that couples the device to network 206. Target device 208 also includes a number of memory buffers that are used to hold write data. Such write data may be obtained from various hosts, such as host 202 or host 204. Performance profile 218 has one or more host entries 224 for those hosts configured to send data in a high-performance mode. As shown in FIG. 2E, only "host 1" is configured to send data in a high-performance mode. Rules 210 (and, more particularly, performance rules 214, in one embodiment) are operable on performance profile 218. Performance rules 214 cause target device 208 to reserve a predetermined number of the memory buffers for unsolicited write data sent to target device 208 from those hosts having host entries configured to send data in the high-performance mode. In this embodiment shown in FIG. 2E, target device 208 will reserve a predetermined number of the buffers for unsolicited write data for "host 1," because "host 1" has an entry configured as "HI." Performance rules 214 cause target device 208 to use the memory buffers only for solicited write data sent to target device 208 from those hosts not having host entries configured to send data in the high-performance mode (such as "host 2").

Figure 3:
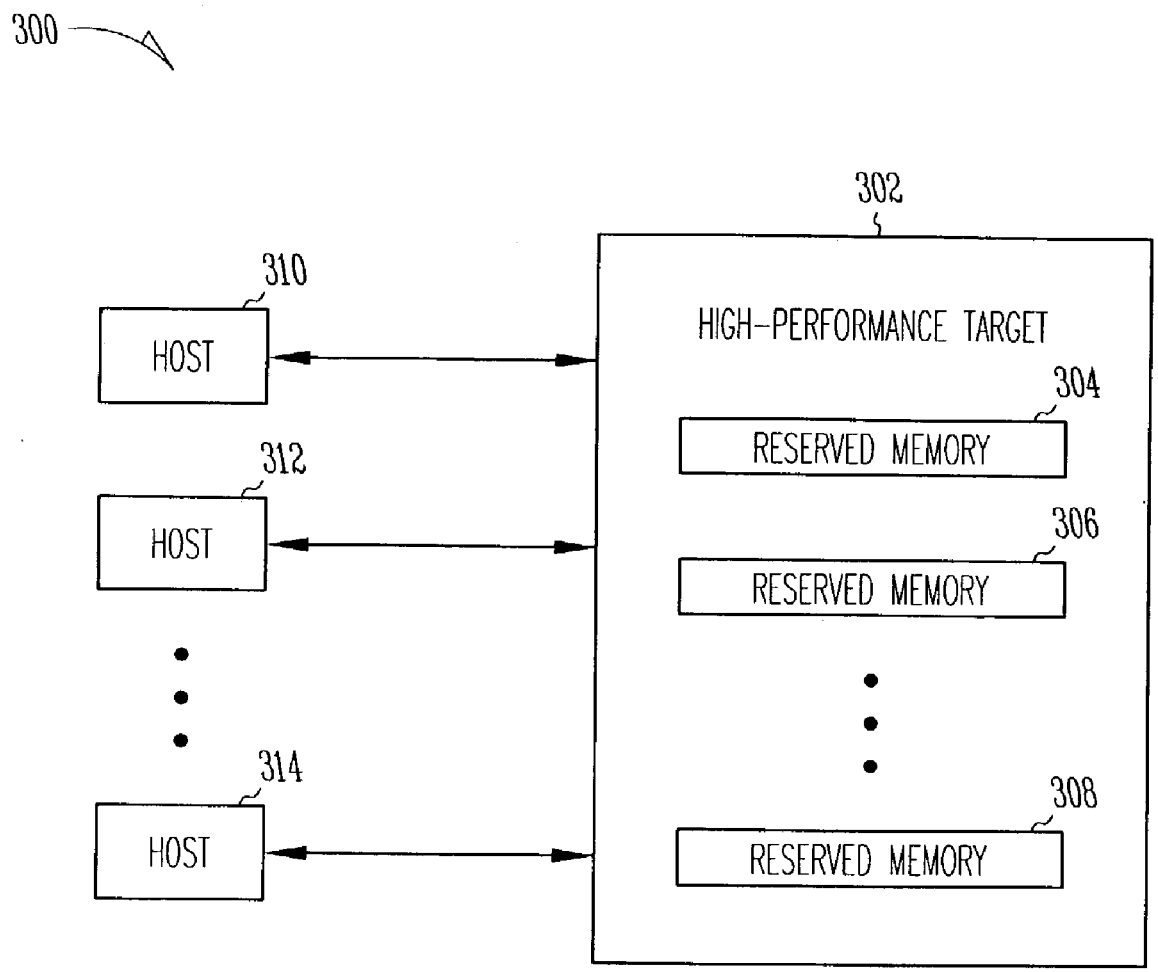
FIG. 3 shows a block diagram of a system having a number of hosts and a high-performance target, according to one embodiment of the present invention.

FIG. 3 shows a block diagram of a system having a number of hosts and a high-performance target, according to one embodiment of the present invention. FIG. 3 shows more of the details of the memory used in certain embodiments of the invention. System 300 includes a number of hosts, such as host 310, host 312, and host 314. Each host is coupled to high-performance target 302. High-performance target 302 is a target device that has been configured to operate in a high-performance mode. High-performance target 302 includes a number of reserved memory regions 304, 306, and 308. In one embodiment, reserved memory regions 304, 306, and 308 include memory buffers. The memory space for these regions is reserved to hold unsolicited write data that is sent from a given host. In the embodiment shown in FIG. 3, a predetermined amount of memory is reserved for each host coupled to target 302. Each host is allocated this amount of reserved memory for sending unsolicited write data to target 302. As shown, memory region 304 is reserved to hold unsolicited write data sent from host 310. Memory region 306 is reserved to hold unsolicited write data sent from host 312. And, memory region 308 is reserved to hold unsolicited write data sent from host 314. In one embodiment, the amount of memory space reserved for each region 304, 306, and 308 is predetermined by configuration. In one embodiment, the amount of memory space is dynamically configurable, and the amount of reserved space may vary from region to region. In one embodiment, the reserved memory regions 304, 306, and 308 are allocated to hosts based on a first-come, first-serve (availability) basis. In this embodiment, if all of the reserved memory regions are already allocated and in use, subsequent hosts will only be able to initiate lower-performance connections with high-performance target 302 (implementing solicited data transfer). Because high-performance target 302 only has a certain amount of reserved memory space for high-performance throughput (in this embodiment), and if all such space is in use (i.e., allocated for existing host connections), subsequent connections can only be configured for the lower-performance mode.

Figure 4:
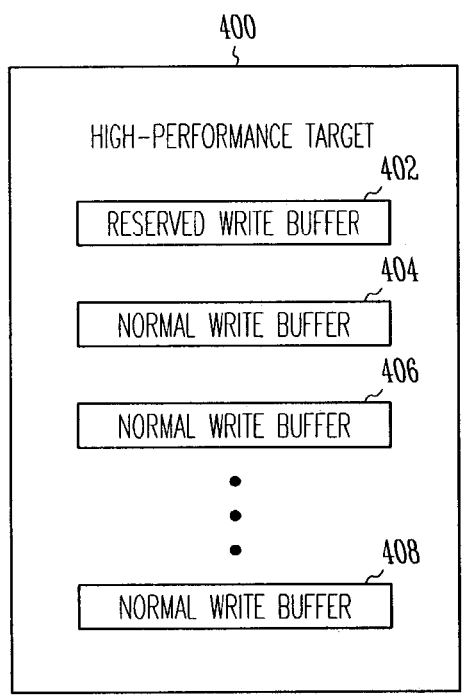
FIG. 4 shows a block diagram of a high-performance target, according to one embodiment of the present invention.

FIG. 4 shows a block diagram of a high-performance target, according to one embodiment of the present invention. In this embodiment, high-performance target 400 includes a number of write buffers for holding write data sent to target 400 from various host devices. These write buffers include both normal and reserved buffers. Reserved write buffer 402 is reserved for unsolicited write data, while normal write buffers 404, 406, and 408 are used for solicited write data. Target 400 operates in a high-performance mode, because at least one of its buffers is reserved for unsolicited write data.

Figure 5:
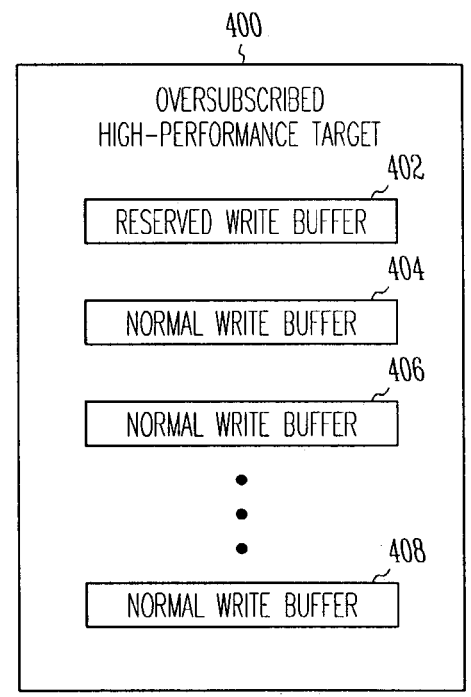
FIG. 5 shows a block diagram of an oversubscribed high-performance target, according to one embodiment of the present invention.

FIG. 5 shows a block diagram of an oversubscribed high-performance target, according to one embodiment of the present invention. In FIG. 5, high-performance target 400 (from FIG. 4) has been configured as an oversubscribed high-performance target. This oversubscription is configured manually (such as by an administrator), in one embodiment. The oversubscription is automatically configured (such as by the system), in one embodiment. In one embodiment of automatic oversubscription, the system monitors the interaction between target 400 and one or more hosts having connections with target 400 over a period of time, and determines the amount of oversubscription that will be implemented. For example, if one host is only sending read commands to target 400, its allocated buffers could be oversubscribed for high-performance use and allocated to another host connection. Oversubsription uses the memory that has already been reserved for high-performance throughput. Oversubscription, therefore, may increase the number of hosts that can send unsolicited write data to target 400. Oversubscribed target 400 still has reserved write buffer 402 and normal write buffers 404, 406, and 408, but uses reserved write buffer 402 for one or more host connections. Each of these host connections may use reserved write buffer 402 for high-performance throughput. In one embodiment, one or more connections initially configured as low-performance connections may use reserved write buffer 402 for unsolicited data flow when target 400 operates in an oversubscription mode. In one embodiment, oversubscription for target 400 is terminated, or "turned off," due to certain conditions in the system. Such conditions could include increased write data flow for one or more host connections over a period of time. In such instances, target 400 may no longer be capable of operating in an oversubscribed mode. In this embodiment, reserved write buffer 402 is reverted to reserved use for only a given host connection (e.g., a connection initially configured for high-performance mode).

A general process for implementing oversubscription, such as the oversubscription shown in FIG. 4 and FIG. 5, is therefore described as follows, according to one embodiment of the present invention. In this embodiment, a computer-implemented method for oversubscribing write data on a target device includes opening a first connection with a first host device in a high-performance mode, reserving an amount of memory for unsolicited write data received from the first host device, opening a second connection with a second host device in a low-performance mode, and initiating an oversubscription process on the target device for the second connection, wherein such initiating includes using the amount of reserved memory for unsolicited write data received from the second host device. In one embodiment, reserving an amount of memory for unsolicited write data received from the first host device includes reserving a predetermined amount of memory for unsolicited write data received from the first host device. In one embodiment, initiating an oversubscription process on the target device for the second connection includes automatically initiating an oversubscription process on the target device based on an interaction history between the target device and the first host device over a period of time. In one embodiment, the method further comprises terminating the oversubscription process on the target device for the second connection to disallow use of the amount of reserved memory for unsolicited write data received from the second host device.

Figure 6:
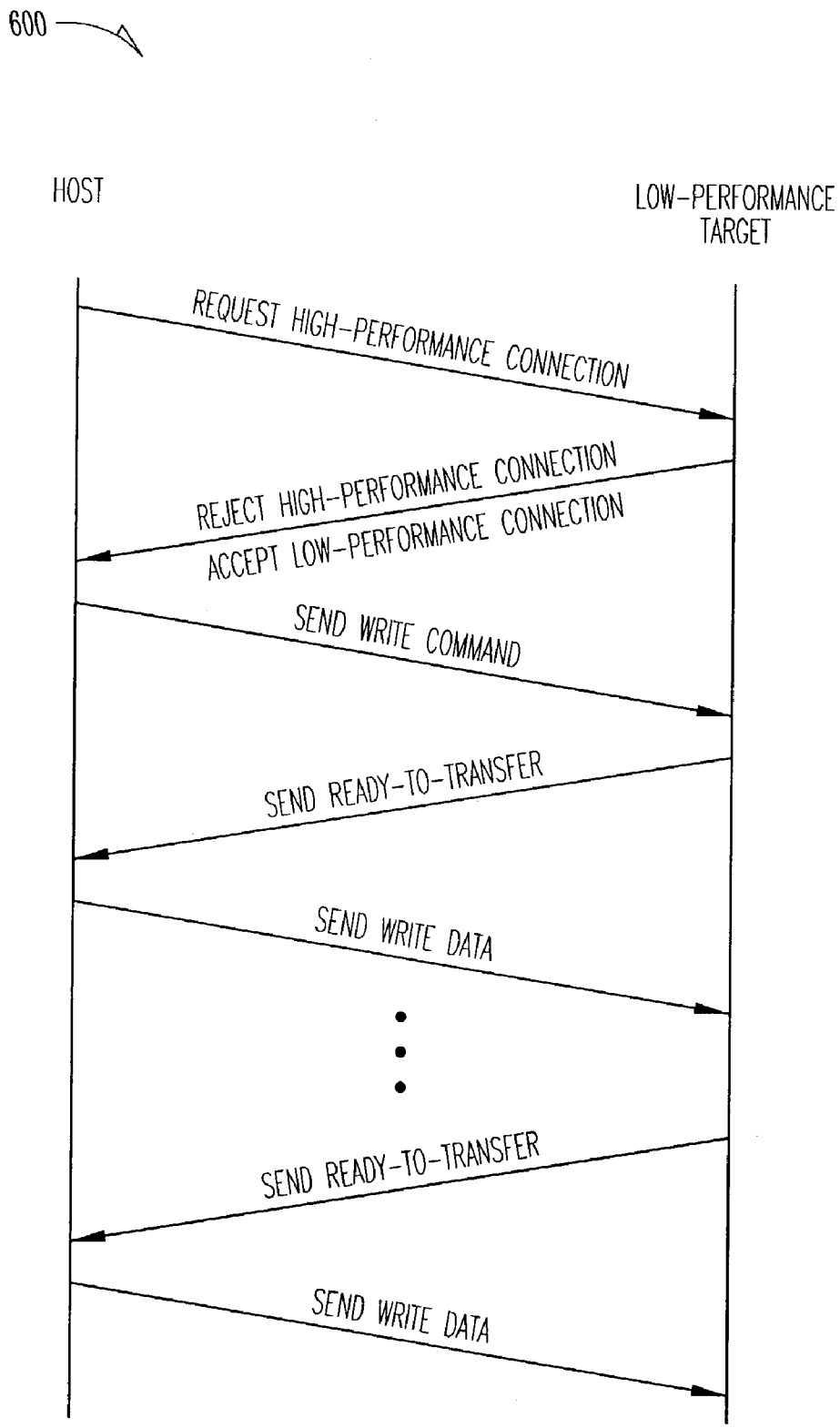
FIG. 6 shows a use-case diagram of data flow between a host and a low-performance target, according to one embodiment of the present invention.

FIG. 6 shows a use-case diagram of data flow between a host and a low-performance target, according to one embodiment of the present invention. FIG. 6 illustrates one embodiment of data negotiation between a host and a target. In FIG. 6, use-case diagram 600 begins with the host sending the low-performance target a request for a high-performance connection. Because the target is only configured to operate in a low-performance mode, the target rejects the high-performance connection request, and rather instantiates (or provides acceptance for) a low-performance connection with the host. After the connection is established, the host may then send the low-performance target a write command. Before the host can send any write data, however, it must receive authorization (or solicitation) from the target to send such data. After the target sends such authorization (such as a SCSI "ready-to-transfer" command), the host may send write data. The host must then wait to receive additional authorizations before sending further write data to the target.

Figure 7:
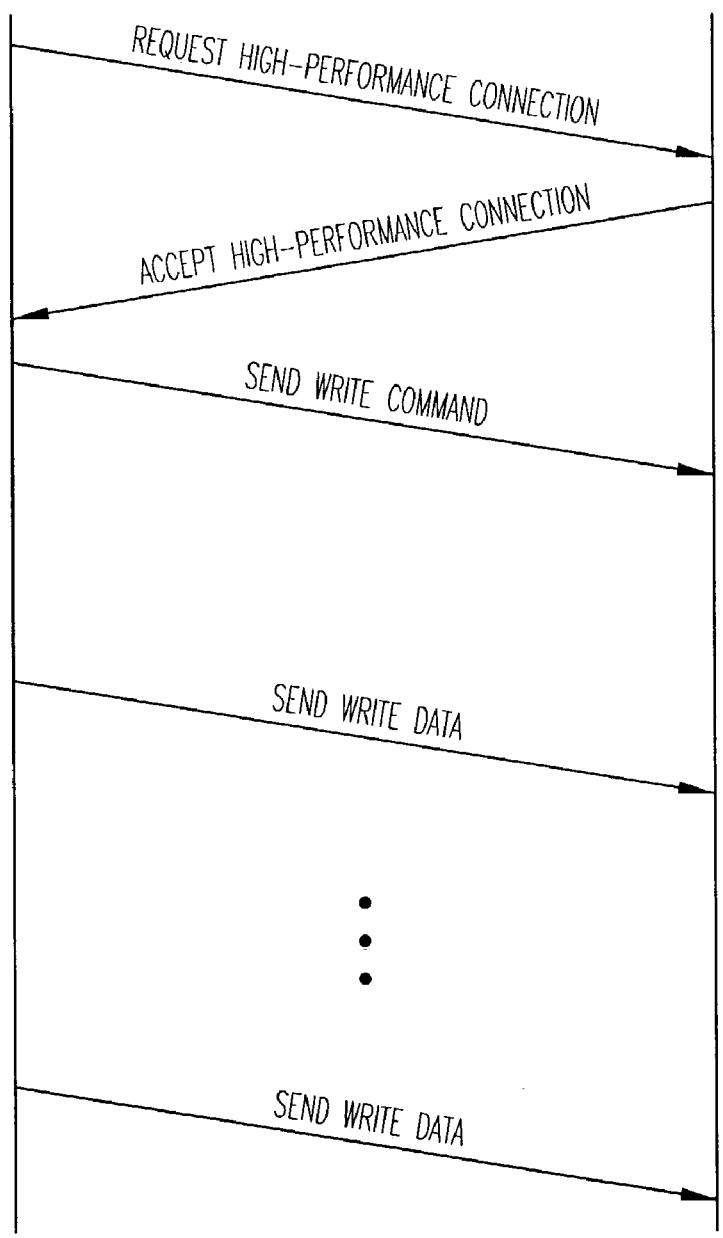
FIG. 7 shows a use-case diagram of data flow between a host and a high-performance target, according to one embodiment of the present invention.

FIG. 7 shows a use-case diagram of data flow between a host and a high-performance target, according to one embodiment of the present invention. FIG. 7 illustrates one embodiment of data negotiation between a host and a target. In FIG. 7, use-case diagram 700 begins with the host sending the high-performance target a request for a high-performance connection. Because the target is configured to operate in a high-performance mode, the high-performance target accepts the high-performance connection request. In one embodiment, the high-performance target only accepts the high-performance connection request if it has available (or unallocated) reserved buffers for high-performance write operations. After the connection is established, the host is able to send a write command to the high-performance target. Because the connection is configured in a high-performance mode, the host is able to send unsolicited write data to the target, without requiring authorization from the target.

A general process for data negotiation, such as shown in the use-case diagrams of FIG. 6 and FIG. 7, is therefore described as follows, according to one embodiment of the present invention. In this embodiment, a computer-implemented method for negotiating data transfer between a first network entity and a second network entity begins by initiating a session between the first and second network entities. The first network entity sends a high-performance request for the session to the second network entity. When the second network entity is configured as a high-performance network entity, the second network entity sends an acceptance to the first network entity in response to the high-performance request for the session. The first network entity then sends a write command to the second network entity, and subsequently sends write data. When the second network entity is not configured as a high-performance network entity, the second network entity sends a rejection to the first network entity in response to the high-performance request for the session. In one embodiment, the session is configured as a low-performance session. After the session is established, the first network entity sends a write command to the second network entity. Before the first network entity sends data, the second network entity must first send it an authorization for sending write data. Upon receipt of such authorization, the first network entity is able to send write data to the second network entity.

Figure 8:
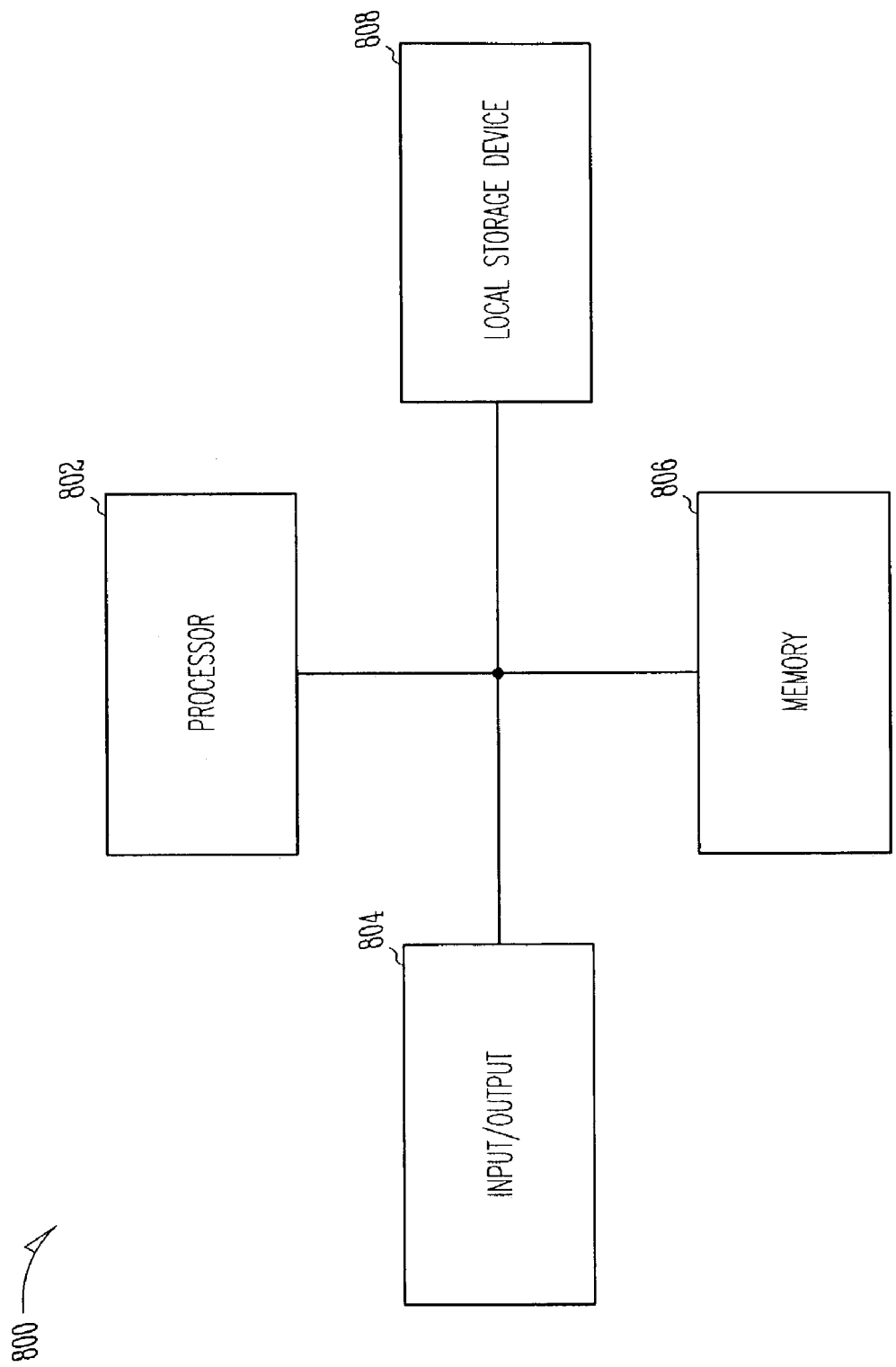
FIG. 8 shows a block diagram of a network entity having an input/output component, memory, a local storage device, and a processor, according to one embodiment of the present invention.

FIG. 8 shows a block diagram of a network entity having an input/output component, memory, a local storage device, and a processor, according to one embodiment of the present invention. In this embodiment, network entity 800 includes processor 802, input/output device 804, memory 806, and local storage device 808. In one embodiment, processor 802, input/output device 804, memory 806, and local storage device 808 are coupled by a network link. In one embodiment, input/output device 804 includes a keyboard and pointing device. In one embodiment, input/output device 804 includes a display. In one embodiment, memory 806 includes both volatile and non-volatile memory. In one embodiment, local storage device 808 includes a mass-storage disk device. Thus, network entity 800 includes various computer-readable media. In one embodiment, network entity 800 includes a host device. In one embodiment, network entity 800 includes a target device.

Figure 9:
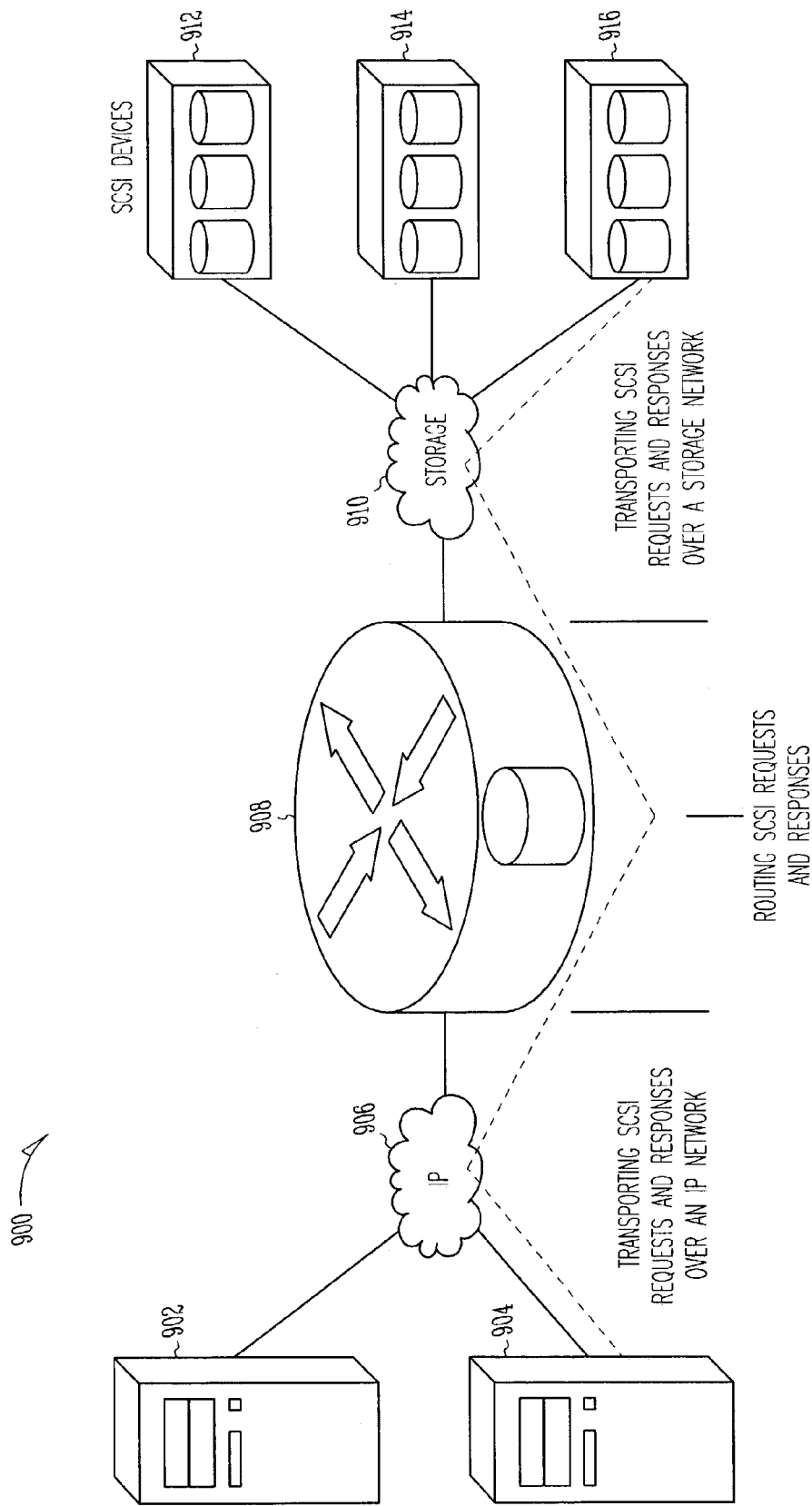
FIG. 9 shows a block diagram of a network-based storage system for implementing various embodiments of the present invention.

FIG. 9 shows a block diagram of a network-based storage system for implementing various embodiments of the present invention. System 900 includes network entities 902 and 904. In one embodiments, network entities 902 and 904 are host computing devices. Network entities 902 and 904 send data to routing device 908 via network 906. In one embodiment, routing device 908 is a target device. In one embodiment, network 906 is an Internet Protocol (IP) network that is capable of transporting SCSI requests and responses. In one embodiment, iSCSI data is also communicated across network 906. In one embodiment, routing device 908 includes iSCSI interfaces, to route iSCSI requests and responses. In one embodiment, routing device 908 is configured as either a high-performance or a low-performance target device. In one embodiment, one of the network entities 902 or 904 issues a SCSI request and encapsulates the SCSI request in one or more IP packets. The encapsulated SCSI request is routed across IP network 906 to routing device 908, where the SCSI request is extracted from the one or more IP packets. In one embodiment, these IP packets comprise unsolicited write data sent to routing device 908. The extracted SCSI request is then routed through storage network 910 to a storage device (e.g., 912, 914, or 916) In one embodiment, the storage device is a SCSI device. In one embodiment, storage network 910 includes a fibre channel network.

As is shown in FIG. 9, system 900 can be viewed as performing three distinct actions for each request. First, SCSI requests are transported over an IP network. Second, SCSI requests are routed through routing device 908 to storage network 910. Finally, the SCSI request is transported across storage network 910 to a SCSI device (e.g., 912, 914, or 916). In one embodiment, the requests are transmitted in unsolicited fashion, wherein routing device 908 is configured in a high-performance mode. System 900 can also be viewed as performing three distinct actions for each response. First, SCSI responses are transported from a SCSI device (such as 912, 914, or 916) across storage network 910 Second, SCSI responses are routed through routing device 908 to IP network 906. Finally, the SCSI response is transported across IP network 906 to one of the network entities 902 or 904.

Figure 10:
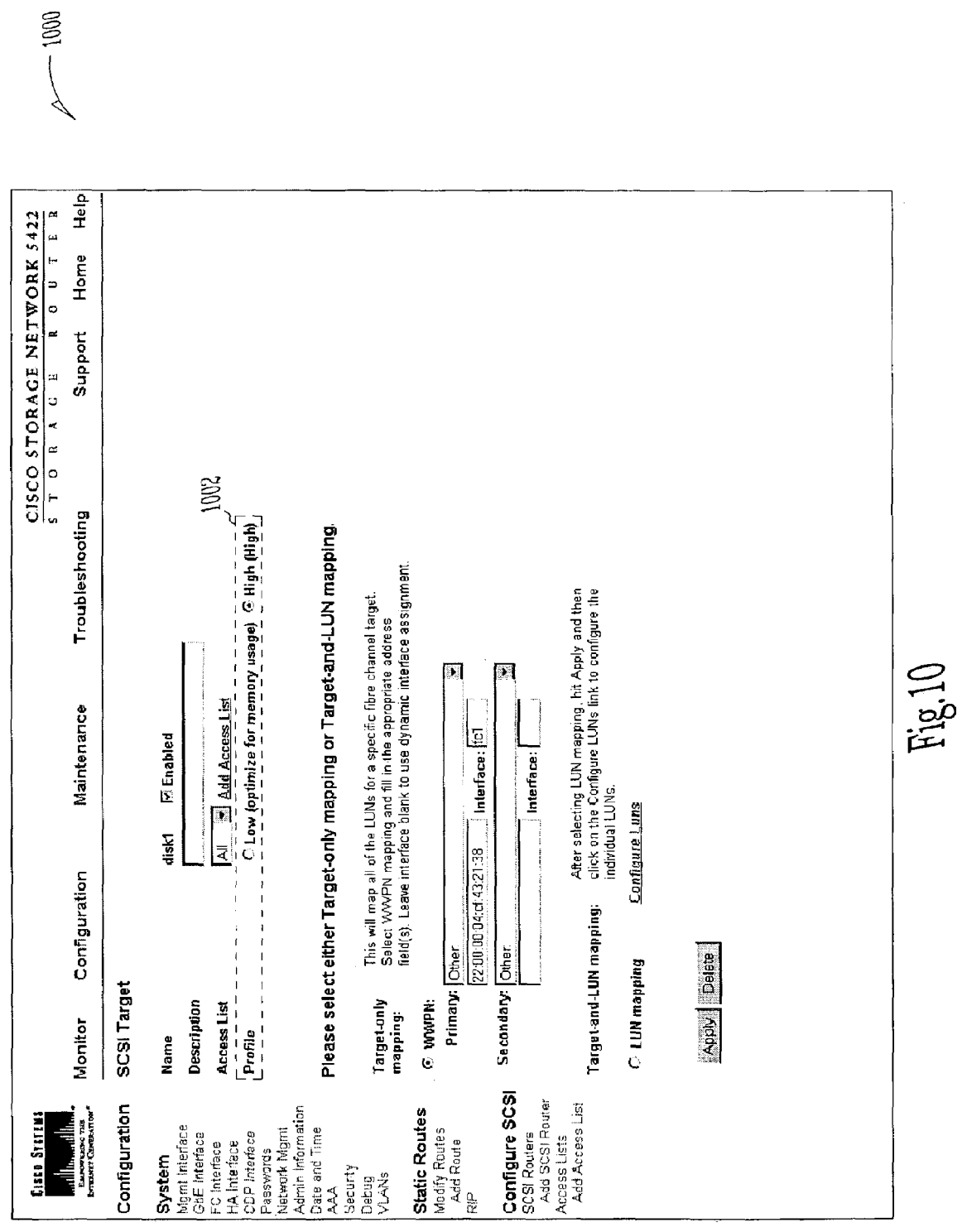

FIG. 10 shows an example screen display for configuring performance profiling, according to one embodiment of the present invention. In FIG. 10, screen display 1000 shows various configuration parameters for a target device. In one embodiment, the target device is a SCSI target. Particularly, parameter 1002 can be used for configuring performance profiling. Profile parameter 1002 can be set to "Low" or "High." When set to "Low," the target operates in a low-performance mode, and memory is utilized for solicited data flow. In one embodiment, a full set of memory buffers are used for solicited data, because none are used (or reserved) for unsolicited data. When set to "High," the target operates in a high-performance mode. In this mode, a specified amount of memory is reserved for high-performance throughput (in an unsolicited fashion).

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A device for managing network-storage, comprising:
   a network interface used to couple the device to a network;
   a memory space used to hold write data;
   a performance profile having a plurality of host entries, wherein each of the plurality of host entries is associated with one of a plurality of hosts connected to the device over the network and wherein each of the plurality of host entries is configured to a first or second performance mode;
   means for configuring the performance profile, wherein the means for configuring includes means for defining for each of the plurality of host entries which of the first or second performance mode is to be used to receive write data from its associated host; and
   one or more performance rules operable on the performance profile, wherein the performance rules cause the device to reserve an amount of the memory space for unsolicited write data sent to the device when the performance profile is configured to the first performance mode, and wherein the performance rules cause the device to use the memory space only for solicited write data sent to the device when the performance profile is configured to the second performance mode;
   wherein the memory space receives the write data from one of the plurality of hosts and forwards the write data to one or more network-storage devices as a function of a performance rule associated with the first or second performance mode for that particular host.

2. The device of claim 1, wherein the performance profile is configured to a high or low performance mode.

3. The device of claim 1, wherein the performance rules, when operative, cause the device to reserve an amount of the memory space for unsolicited write data sent to the device on a first-come, first-serve basis when the performance profile is configured to the first performance mode.

4. The device of claim 1, wherein the performance rules, when operative, cause the device to reserve a predetermined amount of the memory space for unsolicited write data sent to the device when the performance profile is configured to the first performance mode.

5. The device of claim 1, wherein the device further comprises a storage interface used to couple the device to a storage network.

6. A target device for managing network-storage, comprising:
   a network interface used to couple the device to a network;
   a plurality of memory buffers used to hold write data;
   a performance profile having a plurality of host entries, wherein each of the plurality of host entries is associated with one of a plurality of hosts connected to the target device over the network and wherein one or more of the plurality of host entries enable hosts to send data in a high-performance mode;
   means for configuring the performance profile, wherein the means for configuring includes means for determining whether the high-performance mode is to be used to receive write data from one or more of the plurality of hosts; and
   one or more performance rules operable on the performance profile, wherein the performance rules cause the device to reserve a predetermined number of the memory buffers for unsolicited write data sent to the device from those hosts having host entries configured to send data in the high-performance mode, and wherein the performance rules cause the device to use the memory buffers only for solicited write data sent to the device from those hosts not having host entries configured to send data in the high-performance mode;
   wherein the plurality of memory buffers receives the write data from the one or more of the plurality of hosts and forwards the write data to one or more network-storage devices as a function of one of the performance rules associated with the host writing the data.

7. The target device of claim 6, wherein the network interface includes an Internet SCSI (iSCSI) network interface.

8. The target device of claim 6, wherein the target device further comprises a storage interface used to couple the device to a storage network.

9. The target device of claim 6, wherein the target device further comprises:
   a quality-of-service profile having quality-of-service information; and
   one or more quality-of-service rules operable on the quality-of-service profile to affect quality of service of data transfer between the target device and an external device through the network interface.

10. A network-storage management device for receiving data over a network, comprising:
    means for coupling the device to a network;
    a plurality of memory buffers; and
    a performance profile having a plurality of host entries, wherein each of the plurality of host entries is associated with one of a plurality of hosts connected to the network-storage management device over the network and wherein each of the plurality of host entries is configured to one of two or more performance modes;
    means for configuring a performance profile defining which of the two or more performance modes is to be used to receive write data from one or more hosts, wherein the means for configuring a performance profile includes means for defining one or more performance rules as a function of the two or more performance modes available in the performance profile;
    wherein the performance rules cause the device to reserve a predetermined number of the memory buffers for unsolicited write data sent to the device from hosts having host entries configured to send data in a high-performance mode, and wherein the performance rules cause the device to use the memory buffers only for solicited write data sent to the device from those hosts not having host entries configured to send data in a high-performance mode; and wherein each of the memory buffers is used to hold data, and wherein one or more of the memory buffers receive write data from the one or more of the plurality of hosts and forward the write data to one or more network-storage devices as a function of one or more performance rules associated with the host writing the data.

11. The device of claim 10, wherein the device further comprises a storage interface used to couple the device to a storage network.

12. The device of claim 10, wherein the device further comprises:
   a quality-of-service profile having quality-of-service information; and
   one or more quality-of-service rules operable on the quality-of-service profile, wherein the quality-of-service rules define a quality of service of data transfer between the device and another device through the network interface.

13. The device of claim 1, wherein the device oversubscribes write data from the plurality of hosts, wherein oversubscribing enables the device to receive unsolicited write data from a host in a low-performance mode using a portion of the reserved memory buffers.

14. The target device of claim 6, wherein the target device oversubscribes write data from the plurality of hosts, wherein oversubscribing enables the target device to receive unsolicited write data from a host with its host entry configured in other than the high-performance mode, wherein the unsolicited write data from low-performance mode hosts is written in a portion of the reserved memory buffers.

15. The device of claim 10, wherein the device oversubscribes write data from the plurality of hosts, wherein oversubscribing enables the device to receive unsolicited write data from a host with its host entry configured in other than the high-performance mode, wherein the unsolicited write data from low-performance mode hosts is written in a portion of the reserved memory buffers.

* * * * *